UNITED STATES PATENT OFFICE 2,240,027

ADHESIVE

Frederick S. Bacon, Newton, Mass., assignor to Monsanto Chemical Company, St. Louis, Mo., a corporation of Delaware No Drawing. Application May 25, 1938, Serial No. 209,977

13 Claims. (Cl. 260—41)

My invention relates to adhesives intended for use in uniting fibrous material such as pieces of leather, leather board, cloth and the like and particularly in the manufacture of shoes. While it has been known that the thermoplastic synthetic resins, known as partial polyvinyl acetal resins, have adhesive properties, they have not been considered adapted to use as adhesives in the manufacture of boots, shoes and the like because they have relatively little adhesive power when applied to leather and the like and are subject to cold flow so that joints made with them tend to creep or yield particularly when subjected to continued stress.

I have discovered that the tendency to cold flow of these resins can be almost, if not entirely, overcome by the addition of certain substances in small quantities, that certain other substances have the property of enhancing greatly the adhesive properties of the resins and that certain substances are effective both to prevent cold flow and to increase the adhesive properties. It results from these discoveries that adhesives may be made with thermoplastic vinyl acetal resins as a base and that these adhesives are not only not subject to cold flow but are also so strongly tenacious that they may be used satisfactorily in the manufacture of boots and shoes, belts and the like.

In the manufacture of my improved adhesives most if not all of the standard thermoplastic partial polyvinyl acetal resins may be employed, particularly those described in United States Letters Patent to Morrison, Skirrow & Blaikie, Reissue No. 20,430, dated June 29, 1937, but I prefer to employ one of the resins made with butyraldehyde or formaldehyde, for instance, one made with butyraldehyde having from 16 to 22% hydroxyl groups figured as polyvinyl alcohol and sometimes sold under the trade name "butvar" or one made with formaldehyde, having 8% hydroxyl groups figured as polyvinyl alcohol and sometimes sold under the trade name "formvar." The resin is combined with proper amounts of a suitable plasticizer for instance preferably dibutyl phthalate, or dimethyl phthalate as the case may be.

Certain materials, which I have discovered, have the property of stopping cold flow of these resins even when present in quantities as small as one part per one hundred parts of resin and 30–50 parts of plasticizer. Among these are metallic copper, 500 mesh, aluminum powder 150 and 450 mesh; and nickel powder 150 mesh. A chrome orange pigment, essentially consisting of sixty percent lead chromate and forty percent lead oxide, ($Pb_3O_4$) when used in the proportion of one part to 100 parts of resin and 40 to 50 parts of plasticizer completely stops cold flow at 50° C. under a tension of 500 grams per inch of width. Burnt umber appears to be equally good. Many other materials when used in the proportion of five parts or more to 100 parts of resin also exhibit this remarkable property of stopping cold flow of the resin. Some such materials are as follows:

Pigments

"Cadmolith"
Cadmium red
Ultramarine
Carbon black
Burnt sienna
Burnt umber

Metallic oxides

Zinc oxide
Lead oxides
Chrome oxide
Yellow iron oxide
Red iron oxide
Titanium oxide
Manganese oxide

Metals

| | Mesh |
|---|---|
| Powdered copper | 500 |
| Powdered aluminum | 450 |

Chrome pigments

Chrome yellow
Chromium oxide

Miscellaneous

Barium sulfate
Silica powder

Cadmolith mentioned above is a pigment composed of approximately 27% cadmium sulfide, 67–68% barium sulfate and 5.6% zinc sulfide.

All of the above mentioned substances are powders which are chemically inert with respect to the other ingredients of the composition.

"Cadmolith" as mentioned above is the trade name of a group of mixed cadmium and lithopone pigments (Physical and Chemical Examination of Paints, Varnishes, Lacquers and Colors, by H. A. Gardner, 9th edition, page 502 (1939)).

Except as otherwise specified these materials should preferably be ground to 325 mesh, but this fineness is not necessarily required.

We have also found that many of these materials will greatly increase the adhesion of the resins to fibrous materials, such as sole leather. For example, a solution of 100 parts Butvar containing 20% polyvinyl alcohol resin and 30 parts dibutyl phthalate in 500 parts of methanol will not adhere to a fleshed and roughened piece of sole stock. The addition of 1 part of burnt umber pigment produces an excellent bond which can only be pulled apart with great difficulty.

The following materials when used in the proportion of 1 or 2 parts per 100 parts of resin do not increase the bond perceptibly, but when 5 parts are employed substantial and satisfactory increase is obtained.

*Pigments*

"Cadmolith"
Cadmium red
Ultramarine

*Chrome pigments*

Chrome orange
Chrome yellow

*Metallic oxides*

Yellow iron oxide
Red iron oxide
Manganese oxide

*Powdered metals*

| | Mesh |
|---|---|
| Copper | 500 |
| Aluminum | 450 |

I have found only a single substance viz:—burnt umber, which when used in amounts as small as one part to one hundred parts of resin will stop cold flow and at the same time will increase the adhesive properties of the cement to the required extent.

The most successful mixture which I have so far found is, 100 parts partial polyvinyl acetal resin made with butyraldehyde and having an hydroxyl content of approximately 20%, 30 parts of plasticizer (dibutyl phthalate); 500 parts solvent (methanol), and 1 part burnt umber.

Other somewhat less satisfactory formulae are as follows:

| | Parts by weight |
|---|---|
| Butvar resin | 100 |
| Dibutyl phthalate | 30 |
| Chrome orange pigment (325 mesh, containing approximately 60% lead chromate and 40% lead oxide) | 1 |
| Methanol | 480 |

The adhesive made according to the preceding formula effectively prevents cold flow at 50° C.

| | Parts by weight |
|---|---|
| Butvar resin | 100 |
| Dibutyl phthalate | 30 |
| Zinc oxide or Titanium dioxide | 5 |
| Methanol | 480 |

The adhesive made according to the preceding formula is not subject to cold flow at 50° C. but does not have increased adhesion.

In the foregoing description, no attempt has been made to list all the materials which have the property of reducing or stopping cold flow, or of increasing the adhesion or both, and there are undoubtedly many more substances which have these properties which I have not discovered, and I do not limit myself to the use of the substances mentioned, since my invention consists in the discovery that cements made by the solution of the partial polyvinyl acetal resins may be improved by the addition of a substance or substances which reduce or stop the cold flow or enhance the adhesiveness or both.

All of the foregoing formulae contain volatile solvent and produce liquid cements. These cements are used in the ordinary manner in which shoe cements are employed, the adhesive being spread on the stock and allowed to dry until the solvent has evaporated. The film is then moistened with a volatile solvent after which the surfaces to be joined are pressed firmly together usually in a suitable press. However, I do not limit my invention to adhesives or cements which are liquid owing to the presence of volatile solvents, since they may be made also in the form of a film or possibly a powder which is applied to the surfaces to be joined, the union taking place under pressure, or, if necessary, under heat and pressure.

The film of adhesive produced in accordance with my invention has the exceptional property of being capable of being softened by radiant heat as well as by directly applied heat. My novel adhesive is, therefore, particularly adapted for use with cemented tapes and galloon which are used to a large extent in the manufacture of shoes. Also it may be used on skived edges of uppers which are to be held in folded position by adhesive. Further, it may be used on a marginal portion of a roughened outsole and roughened over lasted portion of a shoe upper, and in this way used to firmly attach the outsole to the upper as in ordinary cement shoe procedure.

I claim:

1. The improved adhesive which includes partial polyvinyl acetal resin made with butyraldehyde about 100 parts, plasticizer about 30 parts, and burnt umber about 1 part.

2. The improved adhesive which includes partial polyvinyl acetal resin made with butyraldehyde about 100 parts, plasticizer about 30 parts, volatile solvent about 500 parts and burnt umber about 1 part.

3. A liquid adhesive consisting in a partial polyvinyl acetal resin; a plasticizer; a solvent; and an inert, inorganic pigment, in an amount not exceeding substantially 5% by weight of the resin, which reduces the cold flow without detriment to the adhesive properties of the resin.

4. A liquid adhesive consisting in a partial polyvinyl acetal resin made with butyraldehyde; a plasticizer; a solvent; and an inert, inorganic pigment, in an amount not exceeding substantially 5% by weight of the resin, which reduces the cold flow without detriment to the adhesive properties of the resin.

5. A liquid adhesive consisting in a partial polyvinyl acetal resin made with formaldehyde; a plasticizer; a solvent; and an inert, inorganic pigment, in an amount not exceeding substantially 5% by weight of the resin, which reduces the cold flow without detriment to the adhesive properties of the resin.

6. A liquid adhesive consisting in a partial polyvinyl acetal resin; a plasticizer; a volatile solvent for the resin; and an inert, inorganic oxide pigment, in an amount not exceeding substantially 5% by weight of the resin, which reduces the cold flow without detriment to the adhesive properties of the resin.

7. A liquid adhesive consisting in a partial polyvinyl acetal resin; a plasticizer; a volatile solvent for the resin; and an inert, inorganic sulfide pigment, in an amount not exceeding substantially 5% by weight of the resin, which reduces the cold flow without detriment to the adhesive properties of the resin.

8. A liquid adhesive consisting in a partial polyvinyl acetal resin; a plasticizer; a volatile solvent for the resin; and an inert, inorganic chromate pigment, in an amount not exceeding substantially 5% by weight of the resin, which reduces the cold flow without detriment to the adhesive properties of the resin.

9. A liquid adhesive consisting in a partial polyvinyl acetal resin made with butyraldehyde; a plasticizer; a volatile solvent for the resin; and burnt umber, in an amount not exceeding substantially 5% by weight of the resin, which reduces the cold flow without detriment to the adhesive properties of the resin.

10. A liquid adhesive consisting in a partial polyvinyl acetal resin made with butyraldehyde; a plasticizer; a volatile solvent for the resin; and a pigment, in an amount not exceeding substantially 5% by weight of the resin, composed of approximately 27% cadmium sulfide, 67-87% barium sulfate and 5.6% zinc sulfide, which reduces the cold flow without detriment to the adhesive properties of the resin.

11. A liquid adhesive consisting in a partial polyvinyl acetal resin made with butyraldehyde; a plasticizer; a volatile solvent for the resin; and chrome orange, in an amount not exceeding substantially 5% by weight of the resin, which reduces the cold flow without detriment to the adhesive properties of the resin.

12. A liquid adhesive consisting in a partial polyvinyl acetal resin made with butyraldehyde about 100 parts; a plasticizer for said resin; a volatile solvent for said resin; and about 5 parts of chrome orange.

13. A liquid adhesive consisting in a partial polyvinyl acetal resin made with butyraldehyde about 100 parts; a plasticizer for said resin; a volatile solvent for said resin; and about 5 parts of a pigment composed of approximately 27% cadmium sulfide, 67-87% barium sulfate and 5.6% zinc sulfide.

FREDERICK S. BACON.